(12) United States Patent
Apolinari et al.

(10) Patent No.: US 12,391,009 B2
(45) Date of Patent: Aug. 19, 2025

(54) CHUCK FOR GRIPPING AND MOVING CYLINDRICAL BODIES, IN PARTICULAR FITTINGS AND PIPE SEGMENTS, AND APPARATUS INCLUDING THE CHUCK

(71) Applicant: RITMO S.P.A., TEOLO (IT)

(72) Inventors: Alessandro Apolinari, Cervarese Santa Croce (IT); Renzo Bortoli, Montegrotto Terme (IT); Franco Vittadello, Mestrino (IT)

(73) Assignee: RITMO S.P.A., Teolo (IT)

( * ) Notice: Subject to any disclaimer, the term of this patent is extended or adjusted under 35 U.S.C. 154(b) by 816 days.

(21) Appl. No.: 17/681,972

(22) Filed: Feb. 28, 2022

(65) Prior Publication Data

US 2022/0281016 A1 Sep. 8, 2022

(30) Foreign Application Priority Data

Mar. 2, 2021 (IT) ........................ 102021000004817

(51) Int. Cl.
*B23Q 3/00* (2006.01)
*B23B 31/163* (2006.01)
*B25B 5/14* (2006.01)
*B25D 17/08* (2006.01)
*B29C 65/00* (2006.01)

(52) U.S. Cl.
CPC .. *B29C 66/73921* (2013.01); *B23B 31/16008* (2013.01); *B23Q 3/00* (2013.01); *B25B 5/147* (2013.01); *B25D 17/084* (2013.01); *B29C 66/301* (2013.01); *B29C 66/53241* (2013.01)

(58) Field of Classification Search
CPC .... B25B 1/14; B25B 5/14; B25B 1/08; B25D 17/084; B29C 66/301
See application file for complete search history.

(56) References Cited

U.S. PATENT DOCUMENTS

| 5,556,085 A | * | 9/1996 | Cyr | ........................ B25B 5/147 |
| | | | | 269/258 |
| 6,298,573 B1 | * | 10/2001 | Segal | ..................... B23Q 3/183 |
| | | | | 33/642 |
| 11,179,814 B2 | * | 11/2021 | Nishimura | ............ B23K 11/115 |
| 2016/0332270 A1 | * | 11/2016 | Maurer | ..................... B23Q 1/76 |
| 2017/0225386 A1 | | 8/2017 | Tritt et al. | |

(Continued)

FOREIGN PATENT DOCUMENTS

DE 102005051560 5/2007

*Primary Examiner* — Lee D Wilson
(74) *Attorney, Agent, or Firm* — DUANE MORRIS LLP; Gregory M. Lefkowitz

(57) ABSTRACT

A chuck for gripping and moving cylindrical bodies, in particular fittings and pipe segments, including a main body defining an axis of rotation and a plurality of jaws fastened to the main body. The jaws are movable between a position of maximum closure, in which they are at the minimum distance from the axis of rotation, to a position of maximum opening, in which they are at the maximum distance from the axis of rotation. The chuck can adjust the positions of maximum closure and maximum opening and can move the jaws between the positions of maximum closure and maximum opening. The chuck also allows for the axial fixing of the chuck to a support member and for a connection of the chuck to the support member so that they are angularly rotatable with respect to each other.

14 Claims, 7 Drawing Sheets

(56) References Cited

U.S. PATENT DOCUMENTS

| | | |
|---|---|---|
| 2018/0104907 A1 | 4/2018 | Bortoli |
| 2019/0128760 A1* | 5/2019 | Hansen ................ B25B 5/14 |
| 2021/0031333 A1* | 2/2021 | Hutchinson ........... B25B 5/04 |
| 2022/0281016 A1* | 9/2022 | Apolinari ......... B29C 65/7802 |
| 2023/0158642 A1* | 5/2023 | Lang ................ B23Q 1/0072 |
| | | 269/217 |

* cited by examiner

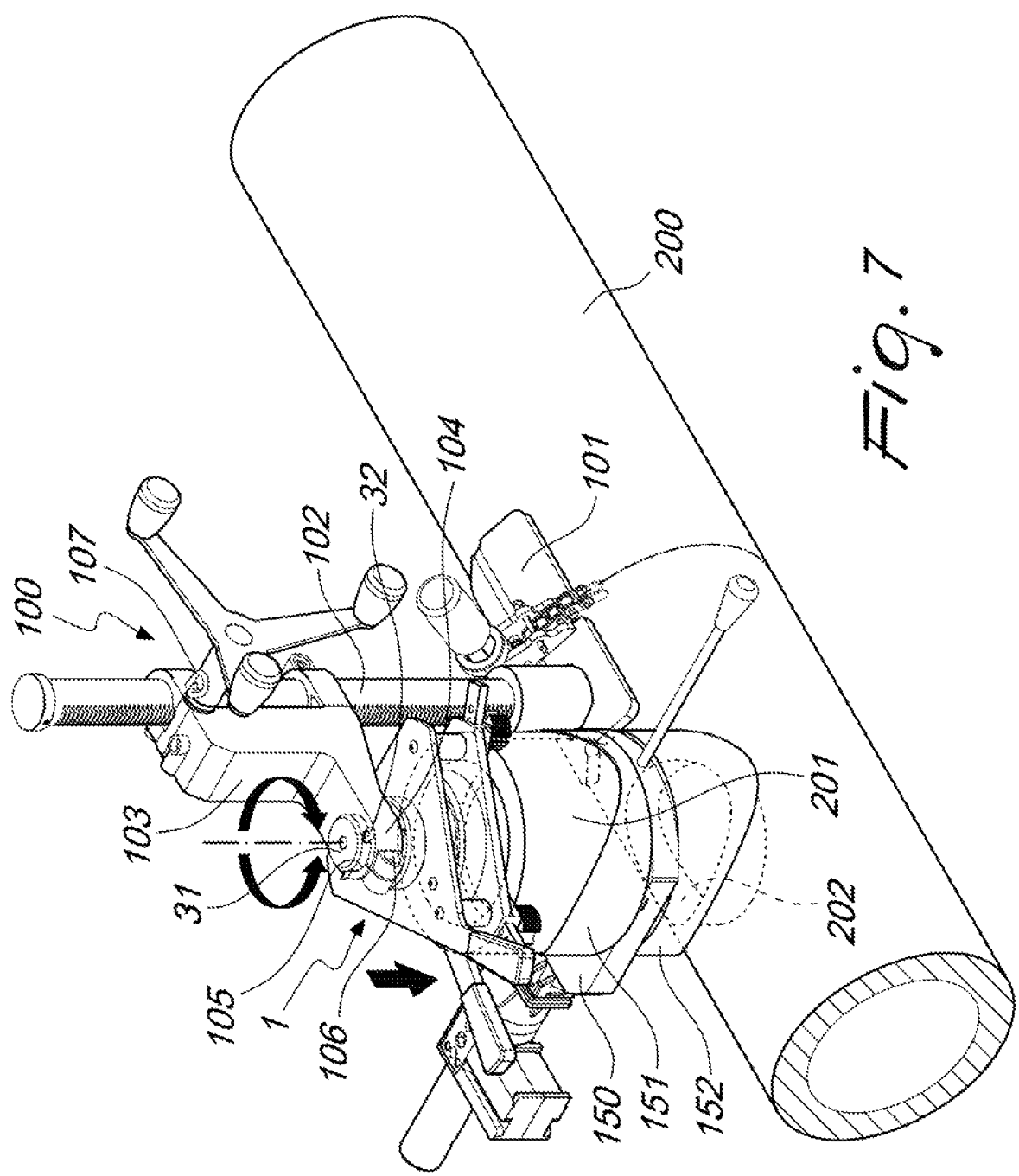

CHUCK FOR GRIPPING AND MOVING CYLINDRICAL BODIES, IN PARTICULAR FITTINGS AND PIPE SEGMENTS, AND APPARATUS INCLUDING THE CHUCK

The present invention relates to a chuck for gripping and moving cylindrical bodies to be used on fittings and pipe segments in particular.

The invention also relates to an apparatus which includes the chuck.

With particular reference to the hydraulic system sector, it is known to use chucks, mounted on dedicated apparatuses and used, for example, for welding saddle branch fittings on pipes, both made of thermoplastic material.

In this regard, it should be noted that welding a saddle fitting on a pipe requires various operating steps, the first of which consists in forming a hole in the pipe.

Once the hole has been correctly formed, the pipe and the fitting are heated by means of a polywelder having heating bushings.

The heating bushings have a concave part designed to act on the outer surface of the pipe, at the hole where the branch is to be applied, and a convex part, which acts on the fitting used to form the branch.

In order to obtain a weld of good quality, it is important that, during the heating step, the surfaces of the bushings perfectly match the surfaces of the pipe and of the fitting.

Once the time required for heating the components to be connected has elapsed, the polywelder is removed and the pipe and the fitting are moved to match up by applying a balanced pressure to all contact surfaces, keeping them pressed for an appropriate time.

The joint is then allowed to cool to room temperature.

In order to facilitate the operations described above, in recent years appropriate apparatuses have been provided having a supporting structure that can be fastened to the pipe and on which a sliding base is mounted. The sliding base is alternatively equipped so as to be able to perform both hole cutting operations and welding operations.

In order to perform the welding operations, the prior art apparatuses are equipped with the chucks mentioned above.

The prior art chucks are essentially constituted by a main longitudinal hollow body having ends closed by disk shaped plugs.

The main body is crossed by a screw which extends beyond the length of the main body and has, at one end, an expanded disk shaped head and, at the opposite end, a threaded portion which is engaged by a rotatable knob which abuts against one of the two plugs of the main body.

A rubber disk is interposed between the expanded head of the screw and the plug of the main body that is not engaged by the knob and, as a consequence of the rotation of the knob, is designed to expand at least partially inside a saddle fitting, so as to lock the latter by mechanical interference.

Such types of chuck are not free from drawbacks, which include the fact that they are generally completely bound to the structure that supports them.

For example, the main body of the chuck is locked inside a collar, formed in the sliding base, and provided with a locking lever.

However, it should be noted that saddle fittings have such a geometry as to mate with the shape of the pipe; their shapes depend on the diameter of the main pipe and on the diameter of the branch pipe.

These geometric conditions provide that the saddle fitting necessarily must be oriented in a single position with respect to the main pipe, since a different orientation would compromise a perfect mating.

The fact that known chucks retain saddle fittings in a fixed position with respect to the structure of the apparatus therefore considerably increases the complexity of the operations for heating the various components and the operations for welding, if one wishes to try to avoid compromising the quality of the end result.

It should also be considered that the rubber disk provided on chucks of the known type must substantially be complementary to the internal shape of the saddle fitting.

This entails that in practice, for each diameter of the saddle fitting it is necessary to provide a different chuck, or at least a different rubber disk, making the prior art chucks scarcely versatile.

WO2017139108A1 discloses a tool for use in fusing an outlet fitting in a side wall of a plastic pipe, of the type described above.

US2018/104907A1 discloses a machine for welding saddle connectors by polywelding, during pipe laying. The machine has a base which extends in a first direction, a clamp which can move along the base in the first direction, a bracket mounting means for detachably coupling the machine to a pipe arranged transversely to the first direction, and a means for detachably coupling the base to the bracket mounting means.

DE102005051560A1 discloses a pipe union welding device having a clamping device with a clamping unit that is fastened and axially adjustable at a tie rod, along a longitudinal axis. The clamping unit has a clamping surface for supporting against an inner surface of a plastic tube and for bracing the clamping device within the plastic tube. The clamping device has a receiver at the tie rod for fastening a tool or work piece holder.

The aim of the present invention is to provide a chuck for gripping and moving cylindrical bodies, particularly fittings and pipe segments, and an apparatus including the chuck, that overcome the drawbacks of the cited prior art.

Within the scope of this aim, a particular object of the invention is to provide a chuck and an apparatus that allow to perform correctly the welding, both in place and during construction, of saddle branch fittings made of thermoplastic material on pipes made of the same material.

A further object of the invention is to provide a chuck and an apparatus that allow to obtain a perfect alignment of the fitting with the pipe, at the same time ensuring a better quality of the welds and a high production rate.

A further object of the invention is to provide a chuck and an apparatus that are versatile, that can be easily adapted to the dimensions of the fittings, and that are also simple to use for the operator.

A further object of the invention is to provide a chuck and an apparatus that are safe, functional and efficient.

This aim and these objects, as well as others which will become better apparent hereinafter, are achieved by a chuck for gripping and moving cylindrical bodies, in particular fittings and pipe segments, comprising a main body defining an axis of rotation and a plurality of jaws fastened to said main body; said jaws being movable between a position of maximum closure, in which said jaws are at the minimum distance from said axis of rotation, to a position of maximum opening, in which said jaws are at the maximum distance from said axis of rotation; said chuck further comprising a means for adjusting said positions of maximum closure and maximum opening and a means for moving said jaws between said positions of maximum closure and maximum opening; said chuck being characterized in that it comprises a fixing means adapted to allow the axial fixing of said chuck to a support member and the connection of said chuck to said support member so that they are angularly rotatable with respect to each other.

This aim and these objects, as well as others which will become better apparent hereinafter, are also achieved by an apparatus for providing branches on pipes made of thermoplastic material, comprising a base adapted to be fixed to the outer wall of a pipe being processed and a supporting structure which extends from said base; a support member being slidingly associated with said supporting structure; a movement means engaged with said support member in order to move said support member on command along a processing axis; said apparatus being characterized in that it comprises a chuck according to one or more of the preceding claims, said chuck being fixed axially to said support member and being connected to said support member so that they are angularly rotatable with respect to each other.

Further characteristics and advantages will become better apparent from the description of preferred but not exclusive embodiments of a chuck and an apparatus according to the invention, illustrated by way of non-limiting example in the accompanying drawings, wherein:

FIG. 7 is a view of an apparatus according to the invention which includes a chuck according to the invention.

Figure 1:
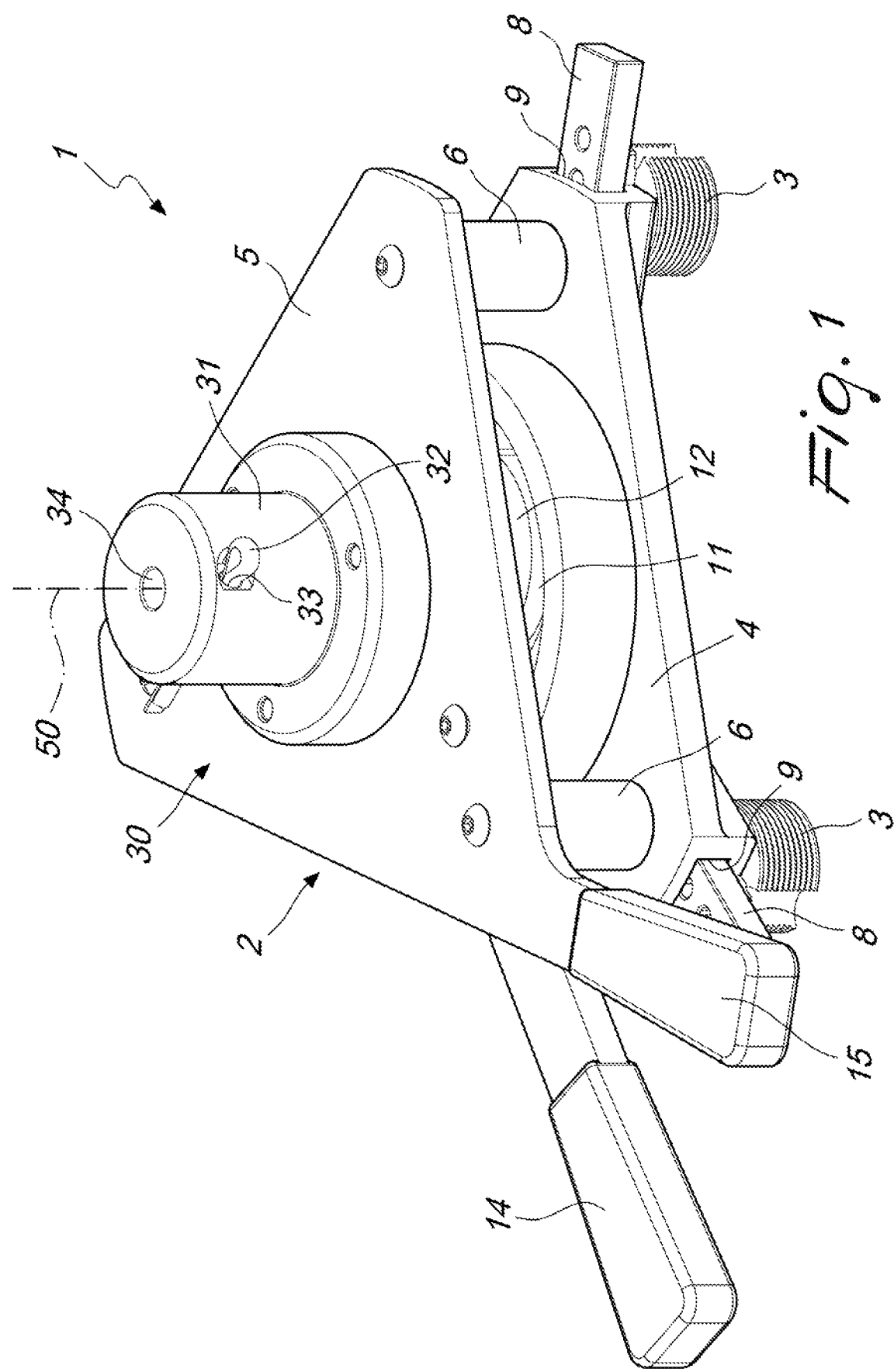
FIG. 1 is a perspective view of a chuck according to the invention.
Figure 2:
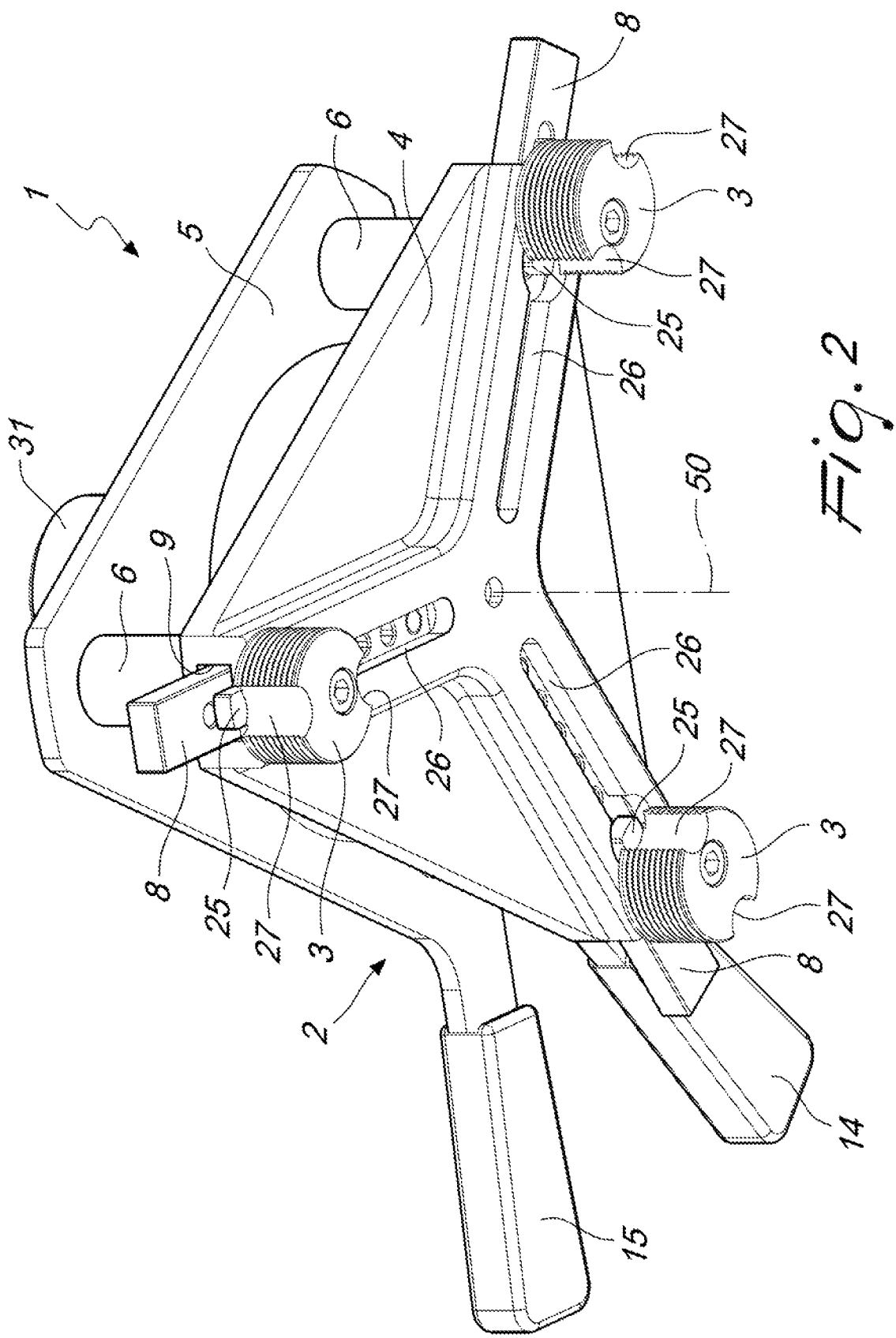
FIG. 2 is a low perspective view of the chuck according to the invention.
Figure 3:
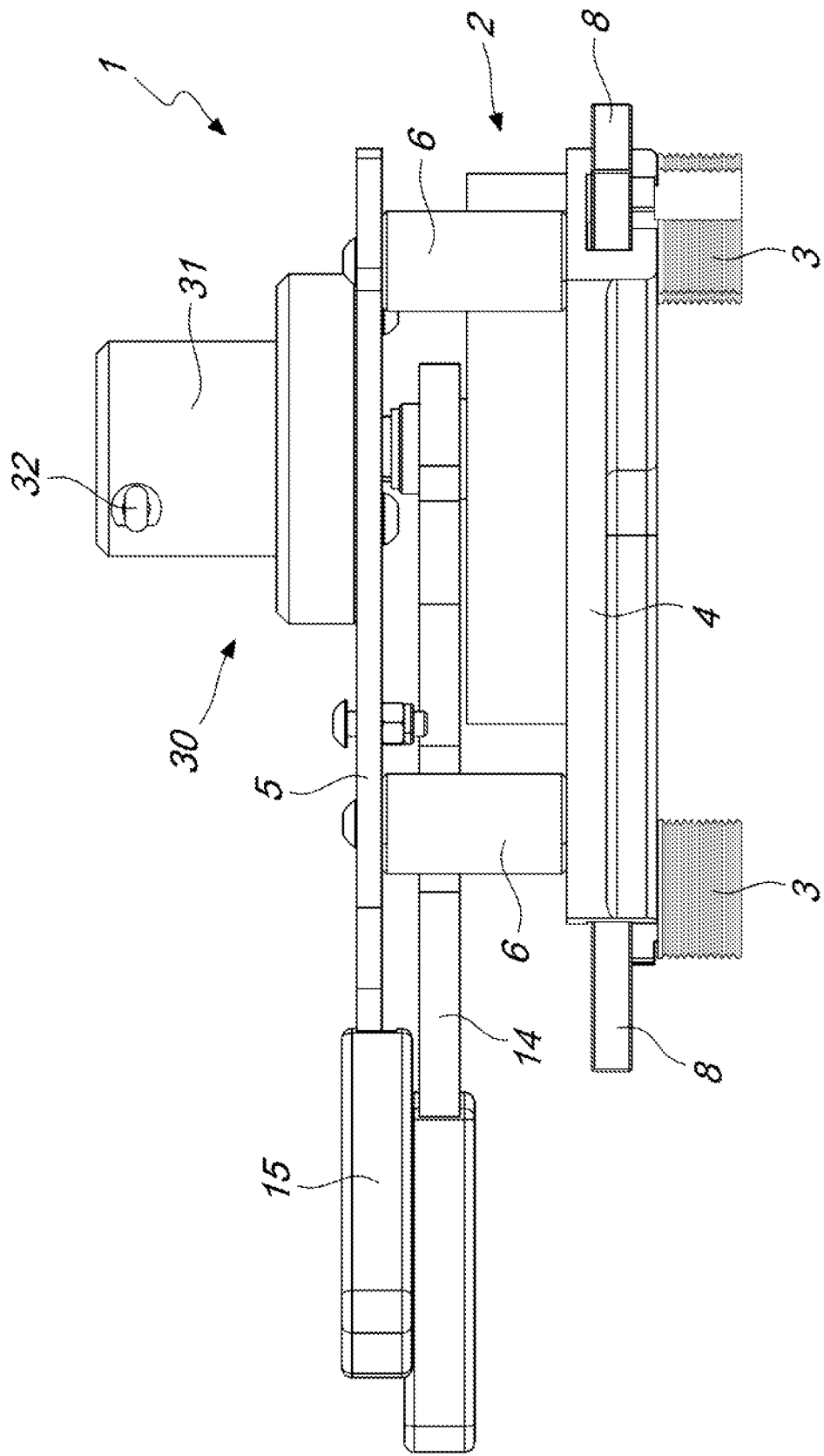
FIG. 3 is a side view of the chuck according to the invention.
Figure 4:
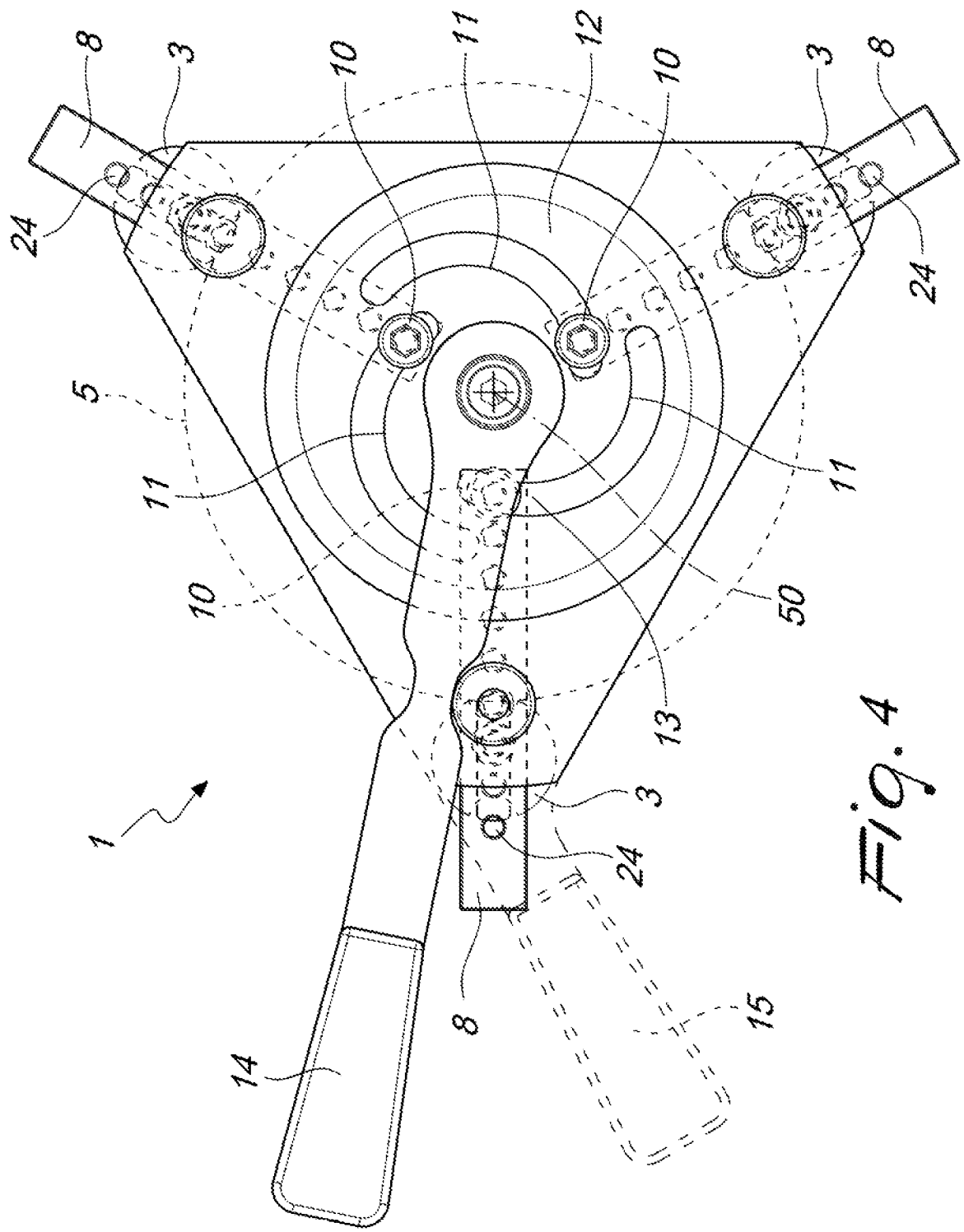
FIG. 4 is a plan view, partially in phantom lines, of the chuck.
Figure 5:
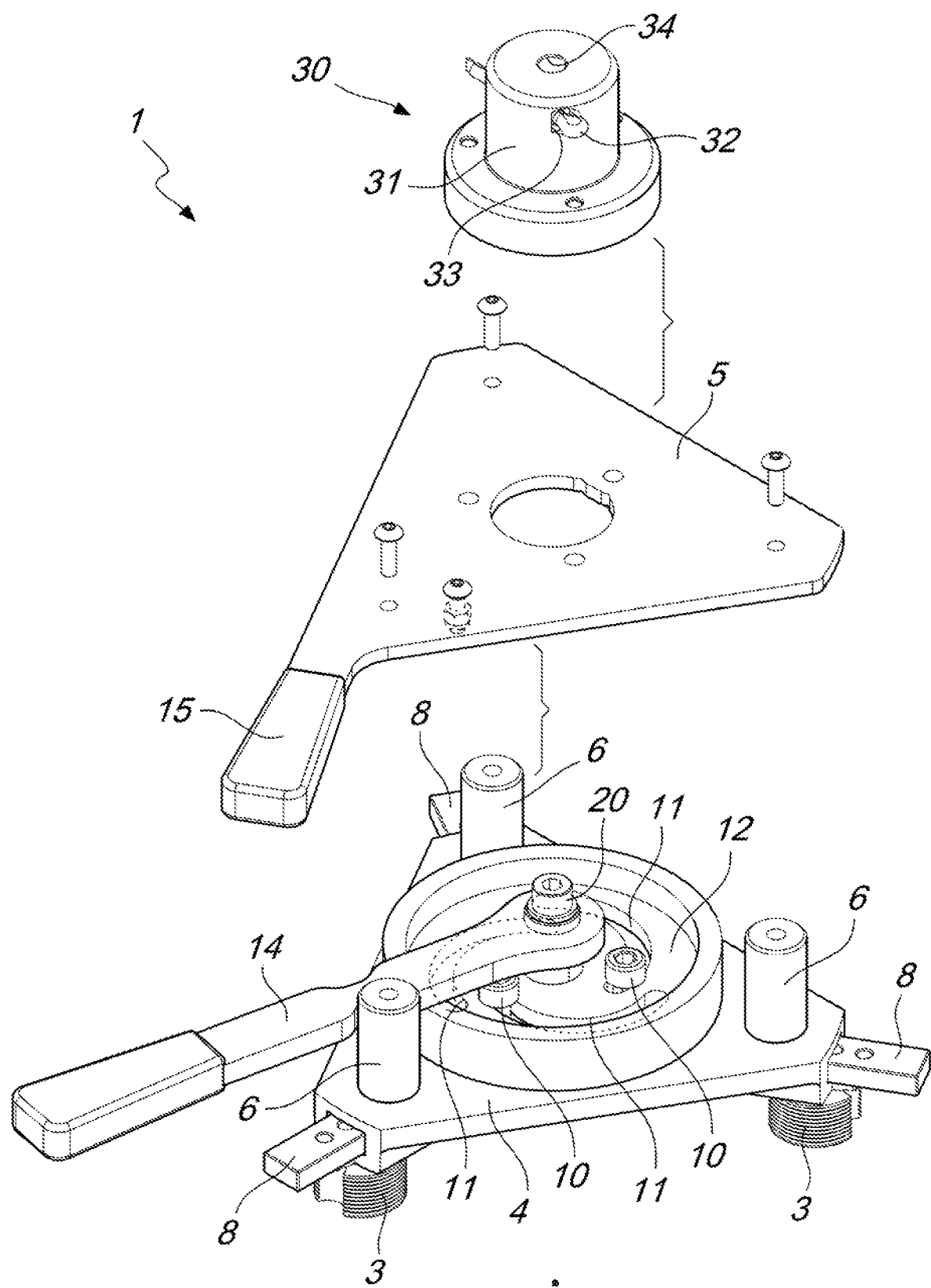
FIG. 5 is an exploded view of the chuck.
Figure 6:
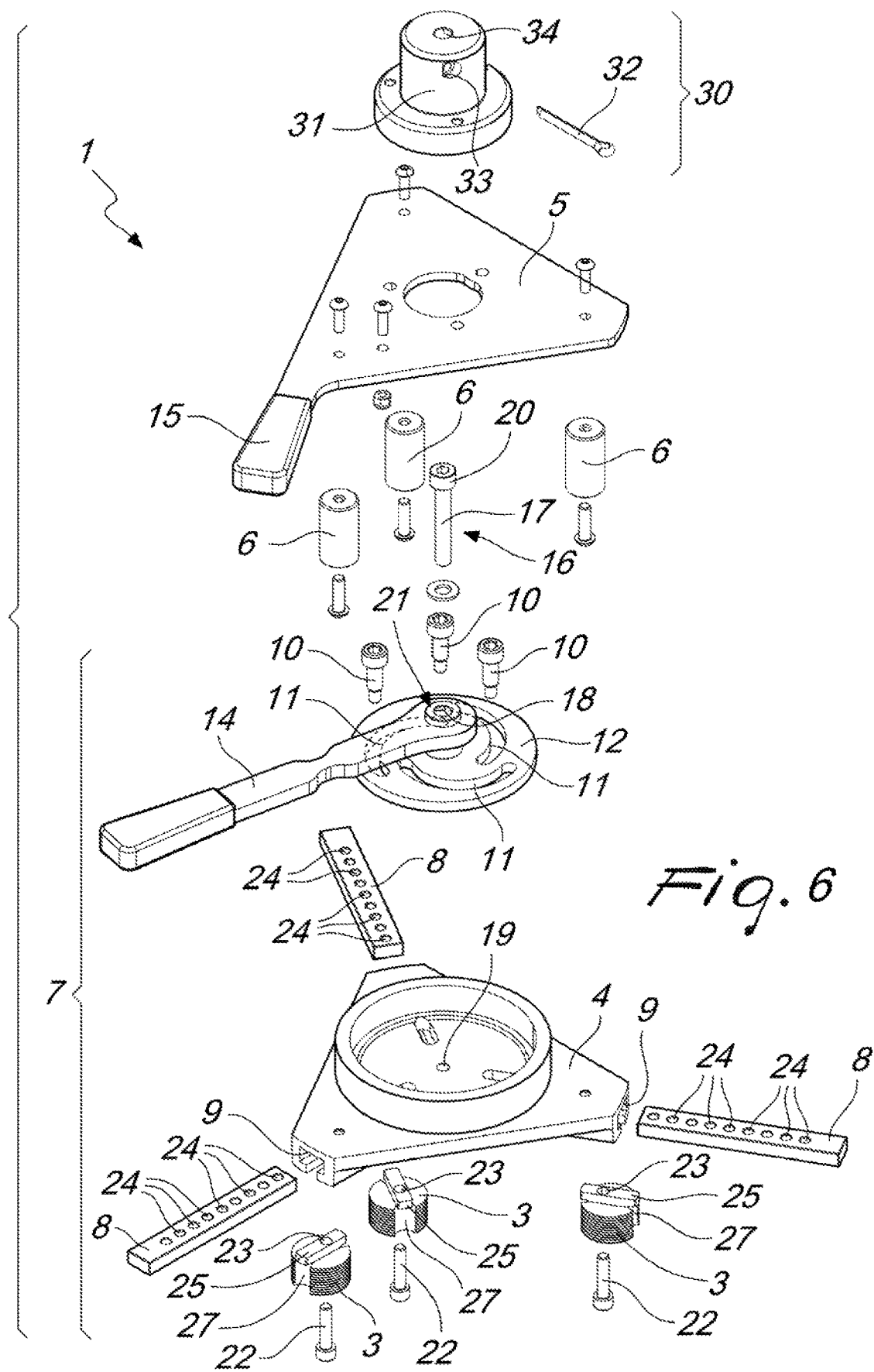
FIG. 6 is another exploded view of the chuck.

With reference to the cited figures, the reference numeral 1 generally designates a chuck for gripping and moving cylindrical bodies, by means of which it is possible, in particular, to lock fittings and pipe segments.

For example, the chuck 1 can be used advantageously in combination with an appropriate apparatus to provide branches on pipes made of thermoplastic material, as will be described better hereinafter.

However, it is evident to the person skilled in the art that the chuck 1 can also be used for other purposes.

The chuck 1 includes a main body 2 having a rotation axis 50 and a plurality of jaws 3, namely three jaws 3, which are fastened thereto.

In the example shown, the main body 2 is constituted by a first plate 4 and by a second plate 5, which are substantially triangular, mutually opposite and mutually joined by virtue of spacers 6.

The jaws 3 can move radially with respect to the rotation axis 50, synchronously between a position of maximum closure, in which they are at the minimum distance from the rotation axis 50, and a position of maximum opening, in which they are instead at the maximum distance from the rotation axis 50.

In this regard, the chuck 1 has mover means, globally designated by the reference numeral 7, for moving the jaws 3: the mover means 7 has a plurality of sliders 8, namely three sliders 8 in this example, each of which supports a jaw 3.

The sliders 8 are slidingly engaged in respective radial guides 9 provided in the first plate 4.

Preferably, the radial guides 9 are arranged at right angles to the rotation axis 50 and are mutually angularly equidistant with respect to it.

The mover means 7 also includes a plurality of pins 10, in the specific case three pins 10, that protrude from the side of each slider 8 that is not engaged by the jaws 3.

The pins 10 are joined to the sliders 8 preferably in a detachable manner and are slidingly engaged in corresponding slots 11 formed in a movable plate 12 associated with the main body 2.

In the specific case, the movable plate 12 substantially consists of a disk-like body which is arranged between the first and second plates 4, 5 and is associated with the first plate so as to allow a rotation with respect to the rotation axis 50.

In the body that forms the movable plate 12 there are three slots 11 that at least partially extend preferably along substantially spiral-shaped directions with respect to the rotation axis 50.

In this manner, the rotation of the movable plate 12 induces the sliding of the pins 10 in the slots 11, which in turn leads to the sliding along the radial guides 9 of the sliders 8 to which the jaws 3 are rigidly connected.

Therefore, by rotating the movable plate 12 with respect to the rotation axis 50, it is possible to move the jaws 3 from a position of maximum closure to a position of maximum opening, and vice versa.

In order to facilitate this maneuver and render it effective, the chuck 1 has an angular position adjuster means 13 for adjusting the angular position of the movable plate 12 with respect to the main body 2.

The angular position adjuster means 13 has a control lever 14, which is fastened to the movable plate 12 and is accessible from the outside of the main body 2.

A grip handle 15 protrudes from the second plate 5 and is configured so as to allow the operator to apply force to the main body 2, preventing a joint simultaneous rotation of the main body 2 during the rotation of the movable plate 12.

The angular position adjuster means 13 also has a connecting member 16 which has a shaft 17 designed to be inserted in a through hole 18 formed in the movable plate 12, in a position that is substantially coaxial to the rotation axis 50.

The shaft 17 has a threaded portion which engages a female thread 19 formed in the first plate 4 of the main body 2, in a position that is substantially coaxial to the rotation axis 50, and a head 20 designed to abut against a perimetric rim 21 of the through hole 18 formed in the movable plate 12.

Advantageously, the head 20 is accessible from the outside of the main body 2, as will become better apparent hereinafter.

In this regard, it should be noted that fastening the connecting member 16 by means of the head 20 make the movable plate 12 lock in the desired position, and therefore also make the jaws 3 to lock with respect to the main body 2.

Preferably, each jaw 3 is constituted by a substantially cylindrical body which is fastened to a corresponding slider 8.

The jaws 3 are fastened to the sliders 8 by means of screws 22 inserted in eccentric fixing holes 23, provided in the corresponding substantially cylindrical bodies and engaged selectively with one of the threaded through holes 24 provided in the sliders 8.

The threaded through holes 24 are formed on each slider 8 in different radial positions with respect to the rotation axis 50 and in practice constitute an actual means for adjusting the positions of maximum closure and maximum opening of the jaws 3.

In this regard, it should be noted that, for an equal position of each slider 8 with respect to the corresponding radial guide 9, the engagement of each screw 22 with one threaded through hole 24 or another conditions the position of the corresponding jaw 3 with respect to the rotation axis 50.

A further way of adjusting the positions of maximum closure and maximum opening of the jaws 3 is given by the characteristics of the eccentric fixing holes 23.

The eccentric fixing holes 23 are in fact arranged so as to allow, for a same threaded through hole 24 chosen to engage the screw 22, to move the jaws 3 closer or further apart with respect to the rotation axis 50, by virtue of a selective rotation of the corresponding substantially cylindrical bodies substantially equal to 180°.

The correct positioning of the jaws 3 in one direction or in the opposite direction can be obtained by utilizing appendages 25 which protrude from one of the bases of each substantially cylindrical body, extending substantially at the diameter.

The appendages 25 are designed to slidingly engage corresponding longitudinally extended openings 26, formed in the radial guides 9 and allow to connect each jaw 3 to the corresponding slider 8 with a rotation-preventing mechanical coupling.

Advantageously, one or more hollows 27, in the specific case two mutually diametrically opposite hollows 27, are provided on each substantially cylindrical body and are extended on the side wall parallel to the rotation axis 50 in order to increase the grip of the corresponding jaw 3 on the part to be retained.

For the same purpose, protrusions and recesses are also alternated on the lateral surface of each substantially cylindrical body and are formed by a number of circumferential grooves, as in the illustrated example. The protrusions and recesses may also be constituted for example by a knurling.

According to the present invention, the chuck 1 has a fixing means 30 that allow to axially fasten the chuck to an adapted support member and simultaneously to connect the chuck to the support member so that they can rotate angularly with respect to each other.

In this example, the fixing means 30 has a shank 31 which has a substantially cylindrical shape and protrudes from the main body 2.

More in detail, the shank 31 is fastened to the second plate 5 and is arranged in a substantially coaxial position with respect to the rotation axis 50.

The shank 31 is rotatably and detachably coupled to a fixing collar which is provided on the support member, as will become better apparent hereinafter.

Advantageously, the fixing means 30 also includes a dowel 32 designed to be inserted in a corresponding hole 33, provided in the shank 31 and arranged transversely with respect to the rotation axis 50.

In this manner, the chuck 1 is prevented from axially sliding with respect to the support member during its use.

Centrally to the shank 31 there is also a through hole 34, which is provided in a position that is substantially coaxial to the rotation axis 50 and is configured so as to allow access to the head 20 of the connecting member 16, in order to tighten or loosen the latter from the outside of the main body 2.

This operation can be performed, for example, by means of a screwdriver, an Allen wrench, a Torx wrench or substantially similar tools.

The operation of the chuck according to the invention is simple and intuitive and provides for it to be associated with a support member of an appropriate apparatus.

With reference to FIG. 7, for example, a schematic view is shown of an apparatus 100 for providing branches on pipes made of thermoplastic material which includes a chuck 1 provided according to the invention.

The apparatus 100 is conceived to provide welds, both in place and during construction, of saddle branch fittings made of thermoplastic material on pipes made of the same material.

The apparatus 100 has a base 101 which is adapted to be fixed to the external wall of a pipe 200 being processed and a supporting structure 102 which extends from the base 101.

The supporting structure 102 consists of a single elongated and preferably column-shaped structural member.

A support member 103 is slidingly associated with the supporting structure 102 and is provided with a fixing collar 104 which has a substantially cylindrical cavity 105, adapted for the coupling of the chuck 1 and/or of another processing/handling means which is interchangeable and provided with an adapted substantially cylindrical coupling portion.

For example, in addition to the chuck 1, it is possible to install on the apparatus 100 hole cutters, adapters for drills and power screwdrivers, or other devices configured to interact with the pipe 200.

The fixing collar 104 is equipped with a selective locking means, preferably constituted by a screw 106 which allows to reduce the diameter of the cavity 105 until it locks by interference the coupling portion of the chuck 1 and/or of the processing/handling means.

The apparatus 100 also has a movement means 107 which is engaged with the support member 103 in order to move it on command along the supporting structure 102.

According to a further aspect of the invention, the apparatus 100 includes a chuck 1, which is fixed axially to the support member 103 and is connected to the support member 103 so that they are angularly rotatable with respect to each other.

In practice, this particular and advantageous coupling is provided by inserting the shank 31 of the chuck 1 in the cavity 105 of the fixing collar 104, screwing in the screw 106 without tightening it, but in any case screwing it in so as to eliminate plays, and inserting the dowel 32 in the corresponding hole 33.

The fact that the chuck 1 is coupled to the support member 103 of the apparatus 100 in a stable manner but so that it can rotate about the rotation axis 50 is particular advantageous both during the heating of the components and in the subsequent welding step, as will become better apparent hereinafter.

In the shown example, the function of the chuck 1 is to retain a saddle fitting 201 designed to be inserted and welded in a hole 202 provided beforehand in the pipe 200.

For this purpose, it is necessary to appropriately position the jaws 3 on the sliders 8, according to the dimensions of the saddle fitting 201.

This operation is performed substantially by choosing in which threaded through holes 24 to engage the screws 22 and how to orient the substantially cylindrical body of the jaws 3 with respect to the eccentric fixing hole 23.

Subsequently it is possible to lock the saddle fitting 201 by actuating the control lever 14 and simultaneously applying force to the grip handle 15, so as to prevent a joint simultaneous rotation of the main body 2 during the rotation of the movable plate 12.

The rotation of the movable plate 12 induces the sliding of the pins 10 in the slots 11, which in turn leads to the sliding along the radial guides 9 of the sliders 8 and to the synchronous radial movement of the jaws 3 which clamp the saddle fitting 201.

The position of the jaws 3 is then fixed by acting on the head 20 so as to move the connecting member 16 to a clamping condition.

At this point, in the case being considered, it is possible to proceed with the heating of the plastic parts to be welded.

More precisely, a polywelder 150 provided with adapted heating bushings 151, 152 is interposed and compressed between the hole 202 and the saddle fitting 201 by acting on the movement means 107.

In this step, if necessary, it is possible to rotate the chuck 1 with respect to the apparatus 100, keeping the polywelder 150 stationary, so as to adapt the curved surfaces of the saddle fitting 201 and of the pipe 200 to those of the heating bushings 151, 152, as substantially shown in FIG. 7.

Once the heating step has been completed, the support member 103 is raised rapidly, so as to allow the extraction of the polywelder 150 and the insertion of the saddle fitting 201 in the hole 202 in order to complete the welding step.

In this case also, if necessary, it is possible to rotate the chuck 1 with respect to the apparatus 100, so as to adapt the curved surfaces of the saddle fitting 201 to those of the pipe 200.

The ability to rotate the chuck 1 with respect to the apparatus 100 is therefore particularly important both during the heating step and during the welding step, since it allows the operator to correctly accommodate the saddle fitting 201, first on the heating bushing 151 and then on the pipe 200.

This allows to obtain significant advantages in terms of quality of the end result, because it allows to obtain a perfect alignment of the saddle fitting 201 with the pipe 200, at the same time ensuring a better quality of the welds and a high production rate.

In practice it has been found that the invention achieves the intended aim and objects, providing a chuck for gripping and moving cylindrical bodies, particularly fittings and pipe segments, and an apparatus including the chuck, that allow to correctly perform the welding, both in place and during construction, of saddle branch fittings made of thermoplastic materials on pipes made of the same material.

In fact, the chuck and the apparatus according to the invention allow to obtain a perfect alignment of the fitting with the pipe, and a perfect match between the various curved profiles.

Also, the chuck and the apparatus according to the invention are versatile and easily adaptable to the dimensions of the fittings, as well as easy to use for the operator; they are furthermore safe, functional and efficient.

The materials used, as well as the dimensions and shapes, may of course be any according to the requirements and the state of the art.

This application claims the priority of Italian Patent Application No. 102021000004817, filed on Mar. 2, 2021, the subject matter of which is incorporated herein by reference.

The invention claimed is:

1. A chuck for gripping and moving cylindrical bodies, in particular fittings and pipe segments, comprising a main body defining an axis of rotation and a plurality of jaws fastened to said main body; said jaws being movable between a position of maximum closure, in which said jaws are at the minimum distance from said axis of rotation, to a position of maximum opening, in which said jaws are at the maximum distance from said axis of rotation; said chuck further comprising a means for adjusting said positions of maximum closure and maximum opening and a means for moving said jaws between said positions of maximum closure and maximum opening; said chuck further comprising a fixing means adapted to allow the axial fixing of said chuck to a support member and the connection of said chuck to said support member so that said chuck and said support member are angularly rotatable with respect to each other, wherein each of said substantially cylindrical bodies comprises one or more hollows which are arranged parallel to said axis of rotation; the outer surface of said substantially cylindrical body having an alternating arrangement of protrusions and recesses.

2. The chuck according to claim 1, wherein said fixing means comprises a substantially cylindrical shank that protrudes from said main body; said shank being arranged in a position that is substantially coaxial with respect to said axis of rotation; said shank being rotatably associable, in a removable manner, to a fixing collar provided on said support member.

3. The chuck according to claim 2, wherein said fixing means comprises at least one dowel which can be inserted into a corresponding hole provided in said shank; said hole being arranged transversely with respect to said axis of rotation.

4. The chuck according to claim 1, wherein said means for moving said jaws comprises a plurality of sliders which are slidingly engaged in corresponding radial guides provided in said main body; said radial guides being arranged transversely with respect to said axis of rotation and being angularly equidistant from each other with respect to said axis of rotation; each of said jaws being mounted on a corresponding slider.

5. The chuck according to claim 4, wherein said means for moving said jaws comprises a plurality of pins that protrude from a side of said sliders that is not engaged by said jaws; each of said pins being joined detachably to a corresponding slider and being slidingly engaged in a corresponding slot which has an at least partially substantially spiral-shaped extension; each of said slots being formed in a movable plate which is associated rotatably to said main body with respect to said axis of rotation; said chuck further comprising an adjuster means for adjusting the angular position of said movable plate with respect to said main body.

6. The chuck according to claim 5, wherein said adjuster means comprises at least one control lever fastened to said movable plate, said control lever being accessible from the outside of said main body.

7. The chuck according to claim 5, wherein said adjuster means comprises a connecting member that has a shaft adapted to be inserted in a through hole formed in said movable plate in a position that is substantially coaxial to said axis of rotation; said shaft having a threaded portion which can be engaged in a female thread formed in said main body in a position that is substantially coaxial to said axis of rotation and a head that is adapted to abut against a perimetric rim of said through hole formed in said movable plate; said head being accessible from the outside of said main body via a through hole formed in said shank, in a position that is substantially coaxial to said axis of rotation.

8. The chuck according to claim 5, wherein said adjuster means, for adjusting said positions of maximum closure and maximum opening, comprises a plurality of threaded through holes formed along each of said sliders in different radial positions with respect to said axis of rotation, said pins that protrude from said sliders being selectively engageable with said threaded through holes formed in said sliders.

9. The chuck according to claim 8, wherein each of said jaws comprises a substantially cylindrical body fastened to a corresponding slider; said cylindrical body having an eccentric fixing hole adapted to accommodate a screw that can be engaged selectively with one of said threaded through holes formed in said sliders.

10. The chuck according to claim 5, wherein said main body comprises a first plate and a second plate which are mutually opposite and joined to each other by means of spacers, said shank being joined to one of said first and second plates, said radial guides being formed in the other one of said first and second plates, said movable plate being arranged between said first and second plates.

11. The chuck according to claim 5, wherein said main body comprises at least one grip handle which protrudes from one of said first and second plates.

12. An apparatus for providing branches on pipes made of thermoplastic material, comprising a base adapted to be fixed to the outer wall of a pipe being processed and a supporting structure which extends from said base; a support member being slidingly associated with said supporting structure; a movement means being engaged with said support member in order to move said support member on command along a processing axis; said apparatus further comprising a chuck according to claim 1, said chuck being fixed axially to said support member and being connected to said support member so that said chuck and said support member are angularly rotatable with respect to each other.

13. The apparatus according to claim 12, wherein said chuck is rotatably and detachably coupled to a fixing collar provided on said support member.

14. A chuck for gripping and moving cylindrical bodies, in particular fittings and pipe segments, comprising a main body defining an axis of rotation and a plurality of jaws fastened to said main body; said jaws being movable between a position of maximum closure, in which said jaws are at the minimum distance from said axis of rotation, to a position of maximum opening, in which said jaws are at the maximum distance from said axis of rotation; said chuck further comprising a means for adjusting said positions of maximum closure and maximum opening and a means for moving said jaws between said positions of maximum closure and maximum opening; said chuck further comprising a fixing means adapted to allow the axial fixing of said chuck to a support member and the connection of said chuck to said support member so that said chuck and said support member are angularly rotatable with respect to each other, wherein said means for moving said jaws comprises a plurality of sliders which are slidingly engaged in corresponding radial guides provided in said main body; said radial guides being arranged transversely with respect to said axis of rotation and being angularly equidistant from each other with respect to said axis of rotation; each of said jaws being mounted on a corresponding slider, wherein said means for moving said jaws comprises a plurality of pins that protrude from a side of said sliders that is not engaged by said jaws; each of said pins being joined detachably to a corresponding slider and being slidingly engaged in a corresponding slot which has an at least partially substantially spiral-shaped extension; each of said slots being formed in a movable plate which is associated rotatably to said main body with respect to said axis of rotation; said chuck further comprising an adjuster means for adjusting the angular position of said movable plate with respect to said main body, wherein said adjuster means, for adjusting said positions of maximum closure and maximum opening, comprises a plurality of threaded through holes formed along each of said sliders in different radial positions with respect to said axis of rotation, said pins that protrude from said sliders being selectively engageable with said threaded through holes formed in said sliders, and wherein each of said jaws comprises a substantially cylindrical body fastened to a corresponding slider; said cylindrical body having an eccentric fixing hole adapted to accommodate a screw that can be engaged selectively with one of said threaded through holes formed in said sliders.

\* \* \* \* \*